Jan. 3, 1928.
R. HILL
SIGNAL SYSTEM
Filed Sept. 3, 1925
1,655,370
3 Sheets-Sheet 1
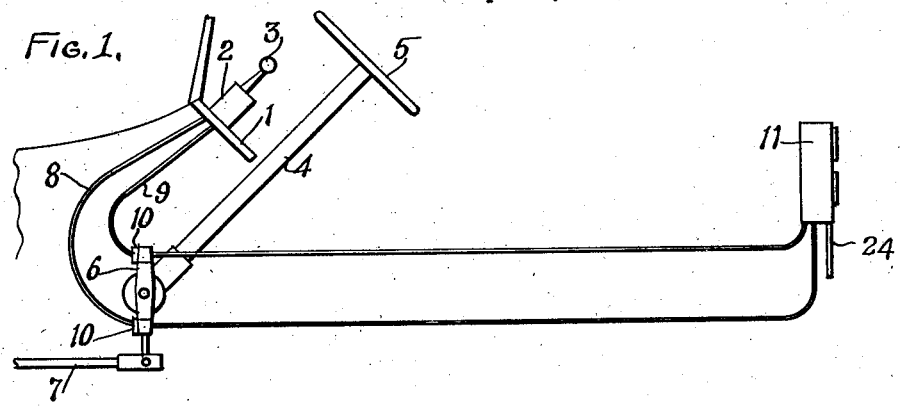
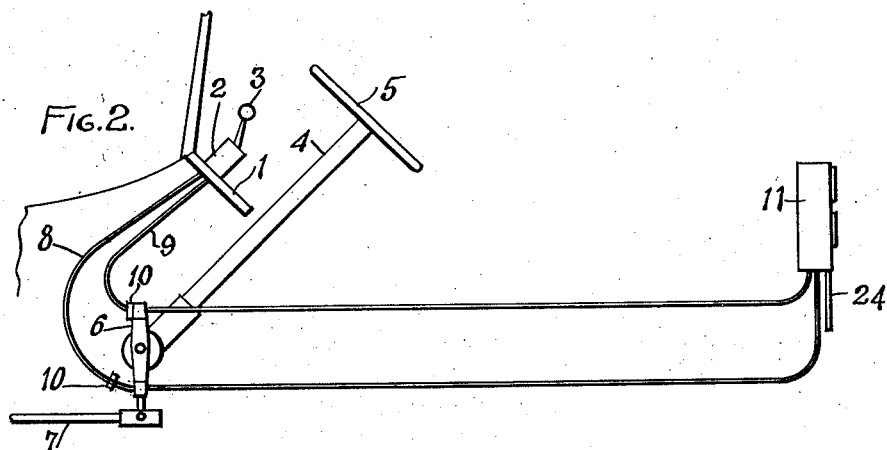
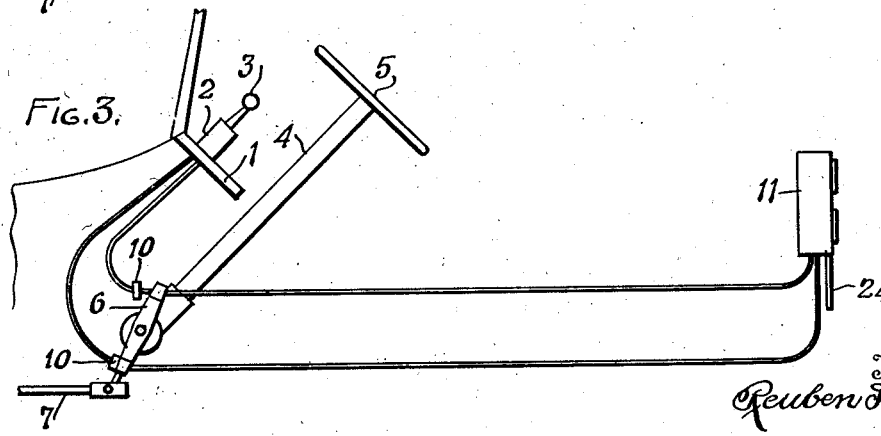
Inventor
Reuben Hill,
By Toulmin & Toulmin,
Attorneys Jan. 3, 1928.  
R. HILL  
SIGNAL SYSTEM  
Filed Sept. 3, 1925  
1,655,370  
3 Sheets-Sheet 2

Inventor  
Reuben Hill,  
By Taulmin & Taulmin,  
Attorneys

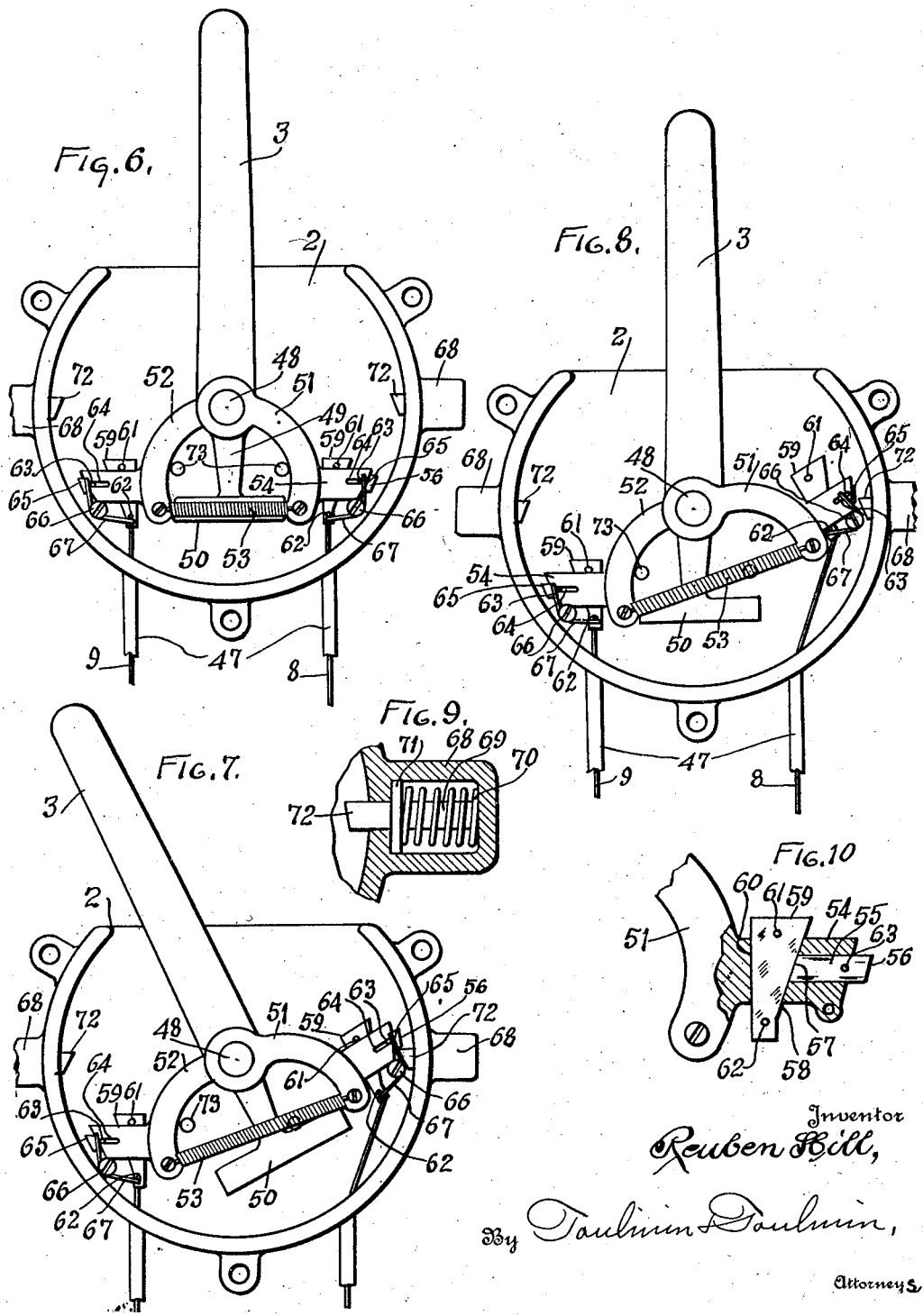

Patented Jan. 3, 1928.

1,655,370

UNITED STATES PATENT OFFICE.

REUBEN HILL, OF WEST HARTFORD, CONNECTICUT, ASSIGNOR OF ONE-HALF TO MINARD A. POSSONS, OF CLEVELAND, OHIO.

SIGNAL SYSTEM.

Application filed September 3, 1925. Serial No. 54,237.

My invention relates to signal systems for vehicles, and is particularly adaptable to automotive vehicles.

The object of my invention is to provide a signal system which is set by the operator to indicate the direction in which the vehicle expects to turn, and is maintained in such position until the vehicle has turned, and by the turning is held in the proper position until the vehicle has accomplished the maneuver, when the movement of the steering apparatus or wheels unlocks the signal and allows it to be restored automatically to its initial position.

It is a further object to provide a hand control, preferably on a dash board, for a signal in the front and rear of a vehicle, so that the signal may be set by hand prior to the time the vehicle is going to execute a given maneuver, thus warning persons in rear or in front of the vehicle what is going to happen. Then when the vehicle starts to turn, the apparatus of the signal will be engaged by an apparatus secured to the steering mechanism holding the signal in a predetermined position, and when the steering gear returns to normal position, it will unlock the signal causing the direction indicating device to be withdrawn from view.

It is a further object in this combination to provide a system of colored lights in the signaling unit which will indicate the direction of travel of the vehicle and will call attention to the direction indicating mechanism which suddenly appears in connection with the light, thus insuring that even those with defective vision and low mentality will understand what is going to happen.

It is a further object to provide a unit having a pre-determined system of lights of pre-determined colors useful both in the daytime and at nighttime.

It is a further object to provide an arrangement whereby if the operator forgets to set the signaling apparatus, then the steering gear when it begins to be moved for the maneuver will move the actuating means and the indicator, thus absolutely insuring indication of the direction of movement of the vehicle, despite the failure of the human element.

Referring to the drawings:

Figure 1 is a diagrammatic view showing the arrangement of the signal in normal position when the vehicle is going straight;

Figure 2 indicates the position of the mechanism when it is set to indicate that the vehicle is going to execute a maneuver;

Figure 3 indicates the position of the mechanism when the vehicle is executing the maneuver and the steering gear has picked up the signaling mechanism holding it in position before releasing it to allow it to return to its initial position;

Figure 6 is a view of the dash board setting mechanism unit with the cover removed, showing it in normal position;

Figure 7 is a similar view showing the mechanism as set by hand, and locked, to indicate the maneuver that the vehicle is about to execute;

Figure 8 is a similar view showing the mechanism in the position in which it is placed when the steering mechanism has picked up the cable and has retracted the cable to place the parts in unlocking position, so that when the steering gear is restored to normal, the signaling mechanism may come back to normal;

Figure 9 is a detail section of the locking plunger on the dash board unit housing;

Figure 10 is a detail view partially in section of the locking plunger carried on the hand actuator of the dash board.

Figure 4:
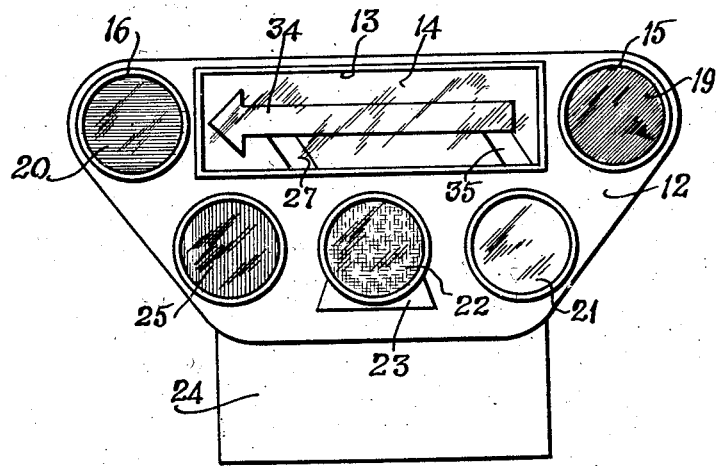
Figure 4 is an elevation of the signal unit, showing a typical form of direction indicating apparatus and a colored light system and a unit container.

Referring to the drawings in detail, 1 is a dash board of a vehicle on which is mounted a casing 2 containing the dash board unit of the mechanism of this invention. 3 indicates the actuating handle of the dash board unit. 4 is a steering column carrying a steering wheel 5.

At the bottom of the steering column is a steering arm 6 connected to a drag link 7. It will be understood that any desired form of connection between the steering mechanism and the cables may be employed as this will vary greatly with the construction of the vehicle. 8 designates one cable and 9 the other cable, on which cables are engagement blocks 10 for engaging with the steering arm 6. These cables lead to the unit indicator housing 11. This housing is provided with a rear plate 12 having a rectangular opening 13 closed by a glass 14.

On either side of this rectangular opening are circular openings 15 and 16 for the direction lights 17 and 18, respectively, beneath right hand green glass 19 and left hand blue glass 20.

Below the rectangular opening 13 are a series of circular openings, reading from right to left, is an opening having a white glass 21 behind which is the reverse light, next, an opening having a yellow glass 22 behind which is a lamp for the tail light, a part of whose rays is reflected downwardly through the hood 23 on the license plate 24 carried on the bottom of the unit housing 11. At the extreme left is a stop light of red glass 25 behind which is an appropriate lamp. The reverse light, tail light and stop light are connected in the usual manner to the vehicle and its operating mechanism.

It is my object to move a direction indicator into visual position to designate the direction of maneuver of the vehicle and simultaneously show the proper colored light for the direction in which the vehicle is to move, by a single actuation of the cable.

The cable 9, for instance, is connected to a bell crank consisting of the arms 26 and 27 to which suitable direction indicators are connected. These arms are pivoted at the point 28 of the bell crank to which is connected a feed wire 29. The free end of the arm 26 is adapted to engage with a contact plate 30 when the upper direction indicator or arrow is in its elevated position. This contact plate 30 is connected by a wire 31 to the lamp 18, the other side of which is connected by a wire 32 to a main feed wire 33. The upper direction indicator 34 is pivotally mounted on the outer end of the arm 27 and to the link 35, which link is pivoted at 36 on the unit 11.

The lower direction indicator is similarly actuated and pivotally mounted on a bell crank having the arms 37 and 38 pivoted at 40 to which is connected the wire 29. The cable 10 is connected to the lower end of the arm 37, and the lower direction indicator 41 is connected to the upper end of the arm 38. The other end of this direction indicator is guided by the link 42 pivoted at 43. A contact plate 44 is connected by a wire 45 to the lamp 17 which is connected on its other side to a wire 46 which, in turn, is connected to the feed wire 33. Thus, when the direction indicators are elevated, the predetermined light will be illuminated. Guide tubes 47 for housing the cables are provided.

Referring to Figures 6, 7, 8, 9 and 10, illustrating the hand control for the unit secured to the dash, the housing 2 contains the handle 3 pivoted on a shaft 48 and has depending therefrom an arm 49 and a cross member 50. This cross member is adapted at its ends to come in contact with respective free arms 51 and 52 also pivoted on the shaft 48, which arms are connected together at their lower ends by a spring 53 serving to hold these arms against the ends of the cross member 50.

Each of these arms 51 and 52 carries a projecting tubular member 54 in which is mounted a horizontally moving sliding plunger 55 having a beveled end 56. This plunger has an inner beveled end 57 engaging the lateral beveled side 58 of a vertically moving plunger 59 which works in the tapered opening 60 of the arm 54, having its larger part at the top so that the member 59 can not be pulled downwardly and through the arm 54. Stop pins 61 and 62 are provided on the member 59 to limit its movement in either direction.

On the sliding plunger 55 a pin 63 is provided, working in the slot 64 of the member 54. This pin 63 is engaged by one member 65 of a spring secured at 66 to the housing 54, while the pin 62 is engaged by the other member 67 of said spring. From either side of the housing extends a lateral member 68 in which is a spring pressed plunger 69 controlled by a spring 70 working against a plate 71 on the plunger. The free end 72 of this plunger 69 partially extends into the casing 2 and into the path of the end 56 of the plunger 55 and compressed thereby until the plunger 55 passes beyond the plunger 69 when the spring 70 acts to force the plunger into the casing 2 when it becomes a stop, as seen in Figure 7, to prevent the return of the plunger 55 prior to the movement of the steering mechanism.

This position of the arm 3 and its cooperating mechanism sets the direction indicator both in the front and rear of the mechine as a notification to drivers of other vehicles of the intended movement of the driver of this machine. This position of these parts is held until after the operation of the steering wheel to make the desired predetermined movement, whereupon the arm 6 coming in contact with the blocks 10 further pulls the cable until the parts assume the position shown in Figure 8 where they are held until the steering gear is returned to normal position.

To automatically return the said parts in the dash unit of this apparatus, a further movement is imparted to the plunger 55 which actuates the spring members 65 and 67 performing the act of pressing the plunger 55, so as to enable it to be swung past and below the plunger 72, thus permitting the return of the dash unit to normal or initial position. Suitable stops 73 located within the path of travel of the arms 51 and 52 serve as limiting movement for these respective arms when the handle 3 is being operated to set signals for either right or left turns of the vehicle. They cause the spring 53, which is the means of connection between the lower ends of the arms 51 and 52, to be put under tension and when the setting lock 55 has been released, this spring will automatically return the setting mechanism to initial position.

As a more direct means of calling attention to the direction indicator, the elongated orifice 13 may be provided with one or more lamps which will illuminate the direction indicator. As a further means of carrying out this illumination of the direction indicator, I contemplate perforating the same and placing lamps behind it.

*Operation.*

Having thus fully described the several mechanisms going to make up my invention, I will now give a general statement of the operation.

Figure 5:
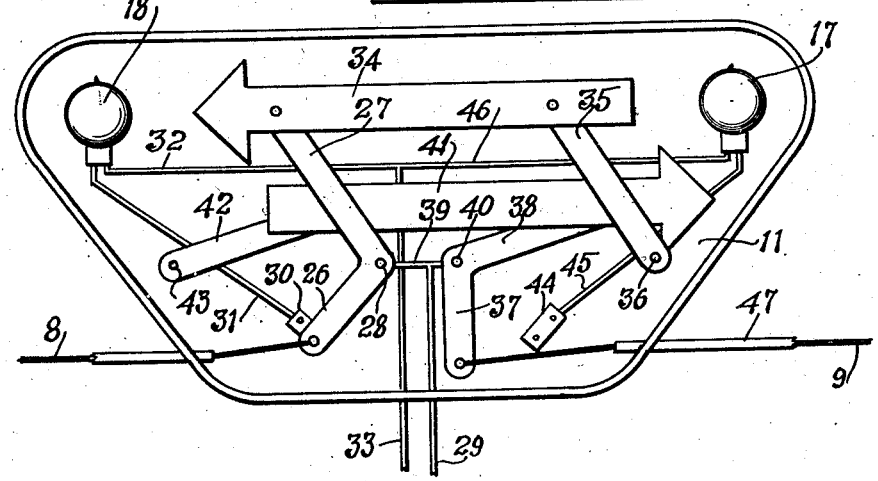
Figure 5 is an elevation of this mechanism with the cover light plate removed.

When the operator desires to make a turn, he will move the handle 3 from the position shown in Figure 1 to that shown in Figure 2 which will exert a pull on the cable 8 moving the same until the block 10 thereon is in the position shown in Figure 2. This pull on the cable will cause the proper direction indicator to be lifted, as also the proper light to be illuminated, in the front and rear units, through the system of levers and wires shown in Figure 5. This movement of the lever 3 will shift the position of the parts in the casing 2 from that shown in Figure 6 to that shown in Figure 7 where they will be retained until the steering mechanism is operated to make the desired turn. The further pull on the cable exerted when the steering arm 6 comes in contact with a block 10 will move the parts from the position shown in Figure 7 to that shown in Figure 8, from which position they will be automatically returned to the normal position shown in Figure 6 by the return of the steering mechanism to normal or straight ahead driving position. However, should the operator fail to move the handle 3 prior to the time he desires to turn the corner, the operation of the steering mechanism will exert the necessary pull on the proper cable to bring the proper direction indicator into view and illuminate the proper lamp. Thus, it will be seen that persons occupying approaching or following machines will be notified that a turn is about to be made irrespective of whether or not the operator has moved the handle 3.

The mechanism on the other side of the handle is the same as that described. Thus, a single housing with a single handle suffices for the operation of preliminary setting, locking, unlocking and automatic restoration to initial position. The spring 53 serves to assist in this return.

The present application shows subject matter described in my copending applications Nos. 84,778, 84,779 and 84,780, each filed on January 29, 1926.

It will be understood that I desire to comprehend within my invention such modifications as may be necessary to adapt it to varying conditions and uses.

Having thus fully described my invention, what I claim as new and desire to secure by Letters Patent, is:—

1. In a vehicle signaling system, an indicator a manual setter for the indicator, communicating means therebetween and means connected with the steering mechanism of the vehicle consisting of a pivoted arm having an eye at each end thereof through which the said communicating means extends for actuating the indicator and restoring the indicator to non-indicating position upon the execution of a pre-determined steering operation, said indicator having movable indicating means so actuated there being a loose connection between the communicating means and the steering mechanism whereby the steering mechanism may move a predetermined amount of movement without actuating the communicating means.

2. In a vehicle signaling system, a manual indicating setting element, a remote indicating element, communicating means therebetween and means operated by the steering mechanism consisting of a pivoted member the same assuming a substantially vertical position after the indicator has returned to its non-indicating position adapted to actuate said communicating means and restore it to inoperative position irrespective of the setting of the setting element there being a loose connection between the communicating means and the steering mechanism whereby the steering mechanism may move a predetermined amount of movement without actuating the communicating means.

3. In a vehicle signaling system, a setting unit, a handle therefor, means therein for locking a communicating means and an indicator mechanism in a pre-determined position, communicating means, indicating means remotely located, means on the steering mechanism of the vehicle for engagement with the communication means to move it a predetermined distance consisting of a pivoted member having eyes at each end, in addition to the initial setting and to hold it in said position during the maneuver indicated on the indicator and thereby unlocking the locking communicating means so that it may be restored to inoperative position upon the restoration of the steering mechanism of the vehicle to the normal direction of the movement of the vehicle.

4. In a vehicle signaling system, a hand operated setting unit, cables adapted to be actuated thereby, a remote indicator connected thereto, direction indicating means in the indicator connected by said cables adapted to be respectively displayed upon the actuation of the respective cables said cables having a threaded connection with a portion of the steering mechanism..

5. In a vehicle signaling system, a manual setting unit consisting of a housing, actuating cables therein, an actuating handle, an actuating head, segment arms pivoted on said handle having their free ends engaging said head, stops for said arms, a yielding means connecting said arms, a vertically operating plunger connected to the respective cables carried by each of said arms, a locking plunger actuated thereby, yielding means for actuating said plunger and a locking plunger on each side of said housing yieldingly forced outwardly for engagement with the first mentioned locking plunger, whereby either of said cables may be set by the movement of said handle and locked in set position, said cable being adapted to be unlocked and restored to normal position by a further movement thereof imparted to it by an outside agency, such as the steering mechanism of the vehicle.

6. In a vehicle signalling system, a controller, an actuating handle, a pivot for the handle, cable levers pivoted on the handle, a contact head carried between the said cable levers carried on the said handle adapted to alternately actuate them, yielding means to normally maintain the said cable levers in engagement with the said head, means to limit the inward movement of the said levers, locking means carried on the said levers, cables attached thereto, and means adapted to interlock the said locking means carried by each of the said cables in engagement with the said locking means.

7. In a vehicle signalling system, a controller, a casing, locking plungers on either side thereof, yieldingly forced inwardly into the said casing, cable levers pivoted therebetween upon a shaft, an actuating lever pivoted on the said shaft having an actuating head between the said levers, yielding means to draw the said levers against the said head, means to limit the inward movement of the said levers, cables slidably connected to the said levers carrying locking heads, means on the said levers for supporting the said locking heads, and a locking plunger carried on each of the said levers adapted to engage the locking plunger on the casing, and yielding means for yieldingly retreating the locking plungers on the levers.

In testimony whereof, I affix my signature.

REUBEN HILL.